United States Patent [19]
Kirkwood et al.

[11] Patent Number: 5,771,691
[45] Date of Patent: Jun. 30, 1998

[54] TORQUE CONVERTER HAVING SPATIALLY ORIENTED FLAT TURBINE BLADES

[75] Inventors: Malcolm E. Kirkwood, Livonia; Michael E. Fingerman, West Bloomfield, both of Mich.

[73] Assignee: Borg-Warner Automotive, Inc., Sterling Heights, Mich.

[21] Appl. No.: 735,778

[22] Filed: Oct. 23, 1996

[51] Int. Cl.[6] ................................................. F16D 33/00
[52] U.S. Cl. .......................... 60/345; 60/366; 416/197 C
[58] Field of Search ............................ 60/330, 341, 345, 60/366; 416/180, 197 C

[56] References Cited

U.S. PATENT DOCUMENTS

| | | |
|---|---|---|
| 2,304,721 | 12/1942 | Werther . |
| 2,429,503 | 10/1947 | Zeidler . |
| 2,660,957 | 12/1953 | Koskinen ................................ 416/180 |
| 2,839,950 | 6/1958 | Russell ................................ 60/345 X |
| 2,963,867 | 12/1960 | Amiard ................................ 60/345 |
| 3,385,060 | 5/1968 | Lazarus ................................ 60/341 |
| 3,507,118 | 4/1970 | Yamaguchi et al. ................... 60/345 |
| 3,665,707 | 5/1972 | Koivunen ............................. 60/345 |
| 3,888,082 | 6/1975 | Haide . |
| 4,086,766 | 5/1978 | Stieger . |
| 4,155,222 | 5/1979 | Ahlen . |
| 4,441,315 | 4/1984 | Bochot ................................ 60/345 |
| 4,510,747 | 4/1985 | Yoshida ............................... 60/343 |
| 4,608,823 | 9/1986 | Maze . |
| 4,726,185 | 2/1988 | Shigemasa et al. . |
| 5,168,702 | 12/1992 | Sakakibara et al. . |
| 5,224,348 | 7/1993 | Ejiri . |
| 5,271,716 | 12/1993 | Ejiri . |
| 5,279,118 | 1/1994 | Hara et al. . |
| 5,282,362 | 2/1994 | Renneker et al. ...................... 60/345 |
| 5,313,793 | 5/1994 | Kirkwood et al. . |
| 5,522,220 | 6/1996 | Locker . |

Primary Examiner—Hoang Nguyen
Attorney, Agent, or Firm—Bliss McGlynn, P.C.; Greg Dziegielewski

[57] ABSTRACT

A torque converter for translating kinetic energy between a prime mover and a transmission including a turbine assembly rotatable about an axis and which includes a shell, a core and a plurality of turbine blades mounted therebetween. The turbine blades have flat working surfaces such that each of the turbine blades is contained in a single plane and such that each of the turbine blades is positioned spatially so as to define an angle Alpha of between −5° and 65° relative to the axis of rotation of the turbine assembly.

17 Claims, 6 Drawing Sheets

TORQUE CONVERTER HAVING SPATIALLY ORIENTED FLAT TURBINE BLADES

BACKGROUND OF THE INVENTION

1. Field of the Invention

The present invention relates, generally, to fluid couplings used to transfer kinetic energy and, more specifically, to a torque converter having spatially oriented flat turbine blades.

2. Description of the Related Art

In automotive applications, engine torque and speed are translated between a prime mover, such as an internal combustion engine, to one or more wheels through the transmission in accordance with the tractive power demand of the vehicle. Hydrokinetic devices, such as torque converters, are often employed between the internal combustion engine and its associated transmission for transferring kinetic energy therebetween.

Figure 1:
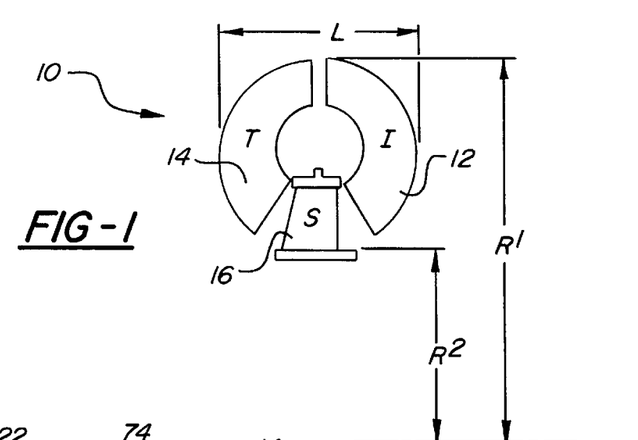
FIG. 1 is a schematic diagram of a torque converter.

As illustrated schematically in FIG. 1, torque converters 10 include impeller assemblies 12 operatively connected for rotation with the torque input from the internal combustion engine, a turbine assembly 14 fluidly connected in driven relationship with the impeller assembly and a stator or reactor assembly 16. These assemblies together form a substantially toroidal flow passage for kinetic fluid in the torque converter. Each assembly includes a plurality of blades or vanes which act to convert mechanical energy to hydrokinetic energy and back to mechanical energy.

Impeller, turbine and reactor blades may be either cast or stamped to a desired shape. Cast blades are most often employed for stators or turbine and impellers in large industrial applications. Cast blades generally have varying thicknesses in the radial and axial directions and contoured working surfaces.

Stamped metal blades are typically cold worked in a form die such that they include ribs stamped thereon for rigidity and strength. Arcuate contours are also imparted to the stamped plate worked blades such that the blades have complex three dimensional working surfaces. For example, conventional turbine blades are curved between fluid inlet, the shell core and the fluid outlet. This is referred to in the art as a "ruled surface" and is generated in production by the form die.

The shape and contour of the blades (blade form) are important considerations which can have significant effects on the capacity, slip, efficiency and overall performance of the torque converter as well as fuel economy of the engine to which the torque converter is coupled. Due in part to this performance sensitivity, the contoured, stamped blades must be made with specific materials which have limited "spring back" characteristics such that there is very little or no deviation from the shape imparted to the metal in the form die.

Accordingly, the shape and contour of conventional blades in the related art must be tightly controlled during production. Such control and sensitive manufacturing procedures increase the cost of manufacturing the torque converter. Thus, there is a need in the art for simplified blades which have good performance characteristics and which can be manufactured at lower costs.

Torque converter performance characteristics can be measured by observing the relationships between torque ratio $(T_2/T_1)$; speed ratio $(N_2/N_1)$; efficiency; and K-factor curves. The K-factor is related to torque converter capacity and slip. In conventional torque converters, the K-factor typically shows a significant rise between speed ratios of 0.5–0.85 as compared to lower speed ratios of between 0–0.3. A rise in the K-factor curve has a negative effect on engine fuel economy. Thus, it is highly desirable to increase or maintain fuel economy and efficiency by inhibiting the rise in the K-factor curve.

In addition to the efforts to maximize performance of the torque converter, there are also design considerations which dictate minimizing, to the extent possible, the space occupied by the torque converter in a transmission housing. However, these "packaging" design objectives often compete with optimum performance requirements. Torque converter packaging may be considered in relation to the ratio of the toroidal axial length L to the radial dimension of the torque converter expressed as $R_1-R_2$, where $R_1$ is the outer radius of the toroid and $R_2$ is the inner radius of the toroid, measured from the axis of rotation 18 as shown schematically in FIG. 1.

This relationship, $L/(R_1-R_2)$, is known in the art as the "squash ratio". Reducing the squash ratio, i.e. minimizing toroidal axial length versus toroidal radial dimension, increases the "squash" of the torque converter and is desirable from a packaging standpoint. Conventional torque converters typically have squash ratios of approximately 1.0. However, and as a general matter, a reduction of the squash ratio has a negative effect on the K-factor curve and reduces the efficiency of the torque converter and the fuel economy of the engine.

Thus, in addition to lowering the cost of manufacturing such turbine blades, there is a need in the art for a turbine blade which has less performance sensitivity, which can be employed in a torque converter having relatively more "squash" than torque converters in the related art, but which does not negatively effect the performance requirements of the torque converter.

SUMMARY OF THE INVENTION

A torque converter of the present invention is employed for translating kinetic energy between a prime mover and a transmission and includes a turbine assembly rotatable about an axis. The turbine assembly includes a shell, a core and a plurality of turbine blades mounted therebetween. The turbine blades have flat working surfaces such that each of the turbine blades is contained in a single plane. Furthermore, each of the turbine blades defines an angle Alpha of between −5° and 65° relative to the axis of rotation of the turbine assembly.

The present invention overcomes the deficiencies in the related art in a torque converter having a turbine blade which is less expensive to manufacture than conventional blades and has less performance sensitivity and better performance stability than conventional turbine blades employed in torque converters of the related art. Furthermore, torque converters employing turbine blades of the present invention exhibit flatter K-factor curves at high speed ratios even at extreme toroidal axial squash.

Because the turbine blade is flat such that its working surface can be contained in a single plane, the use of a form die to impart contours to the blade surface is not required. Because the working surface is not contoured, there is no need for special steels which have minimum "spring back" properties. Thus, the cost to manufacture the flat turbine blade is substantially lower than turbine blades known in the related art. Furthermore, when the flat turbine blade is spatially positioned at an angle Alpha as defined above, a squash ratio of between 0.5–0.95 may be employed without negative impact in the performance characteristics of the torque converter. Thus, the torque converter "packaging" may be reduced without a change in the slope of the K-factor curve at high speed ratios which normally results in reduced fuel economy in torque converters of the related art.

Other objects, features and advantages of the present invention will be readily appreciated as the same becomes better understood after reading the subsequent description taken in conjunction with the accompanying drawings.

DESCRIPTION OF THE PREFERRED EMBODIMENT(S)

Figure 2:
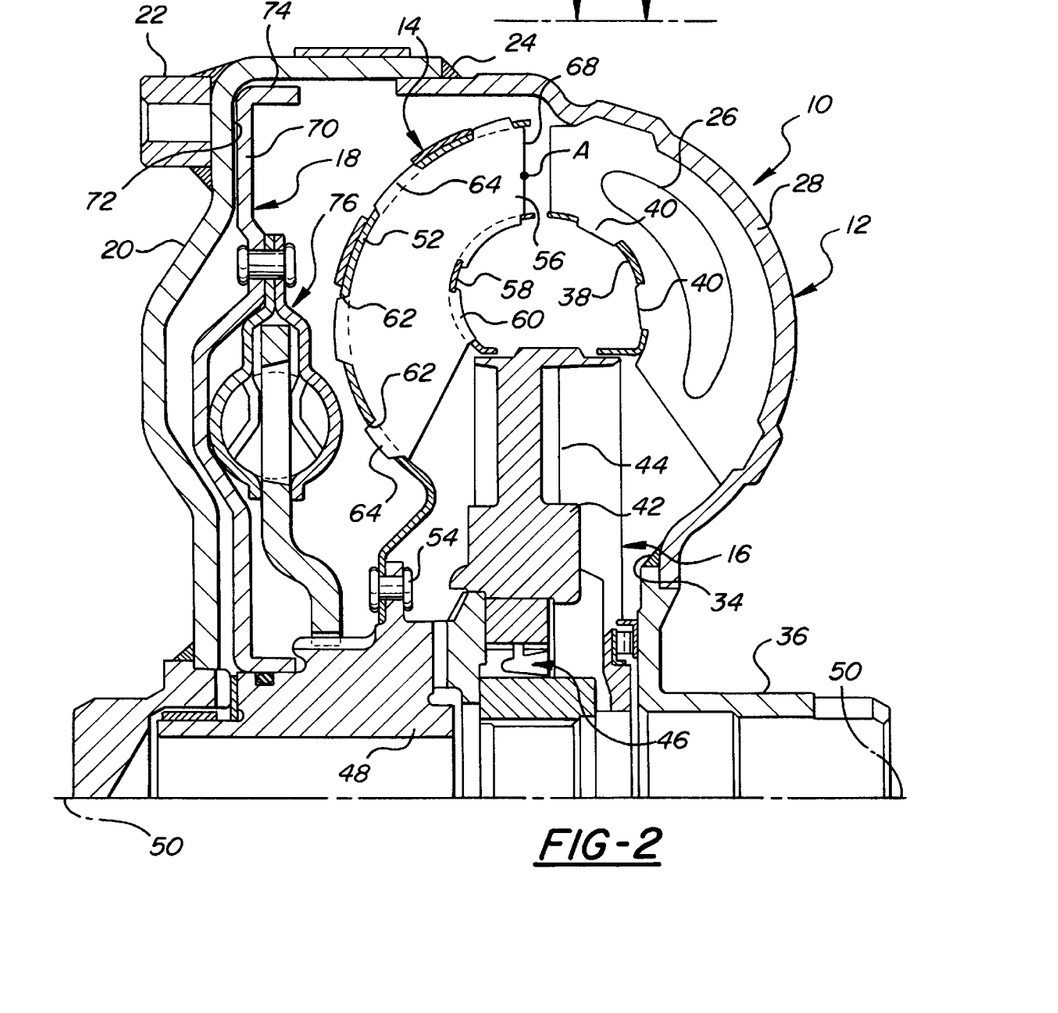
FIG. 2 is a partial cross-sectional side view of a torque converter employing the turbine blades of the present invention.

Referring now to the Figures, where like numerals are used to describe like structure, a hydrodynamic torque converter for translating torque from a prime mover such as an internal combustion engine (not shown) to the input shaft of a transmission is generally shown at 10 in FIG. 2. The transmission may then subsequently distribute this power to one or more wheels (not shown) through other drive train components such as a drive shaft and an axle having a differential (also not shown). While the torque converter illustrated in the Figures is particularly adapted for use with an automotive vehicle, those skilled in the art will understand that the torque converter may be employed in connection with other types of transmissions.

The torque converter 10 includes an impeller assembly, generally indicated at 12, a turbine assembly generally indicated at 14, a stator assembly, generally indicated at 16, and a lock-up clutch assembly, generally indicated at 18. Each of these assemblies will be described in greater detail below.

Power is transmitted from the rotating crank shaft (not shown) of the engine to a torque input member or front cover 20 of the torque converter. The front cover 20 may include a plurality of input drive lugs or threaded connectors 22. A rotatable plate member (not shown) is typically secured to the front cover member 20 by suitable fastening means such as bolts (not shown) which are received in the connectors 22 as is commonly known in the art. The front cover 20 is secured, typically by welding as indicated at 24, to the impeller assembly 12 of the hydrodynamic torque converter 10.

The impeller assembly 12 is fluidly connected in torsional flow relationship in a known manner with the turbine assembly 14 and the stator assembly 16. The impeller assembly 12 includes a plurality of annularly spaced contoured impeller blades 26 connected to the inside of an impeller shell 28. The impeller shell 28 is fixed, as for example by welding at 34, to an impeller hub or host transmission hydraulic pump drive shaft 36. The impeller hub 36 may drive a pump (not shown) from which fluid is supplied to the hydrodynamic torque converter 10. The impeller blades 26 have an arcuate inner portion which is fixed to an impeller core 38 through the interaction of wings 40 received in corresponding slots of the core 38.

The stator assembly 16 is interposed between the impeller assembly 12 and the turbine assembly 14 and includes a cast stator hub 42 and a plurality of stator vanes 44 spaced circumferentially about the stator hub 42. The stator assembly 16 includes a one way clutch assembly, generally indicated at 46, for allowing the stator hub 42 and the stator vanes 44 to rotate in the direction of rotation of the impeller assembly 12 and the turbine assembly 14 and lock in the opposite rotational direction.

Figure 4:
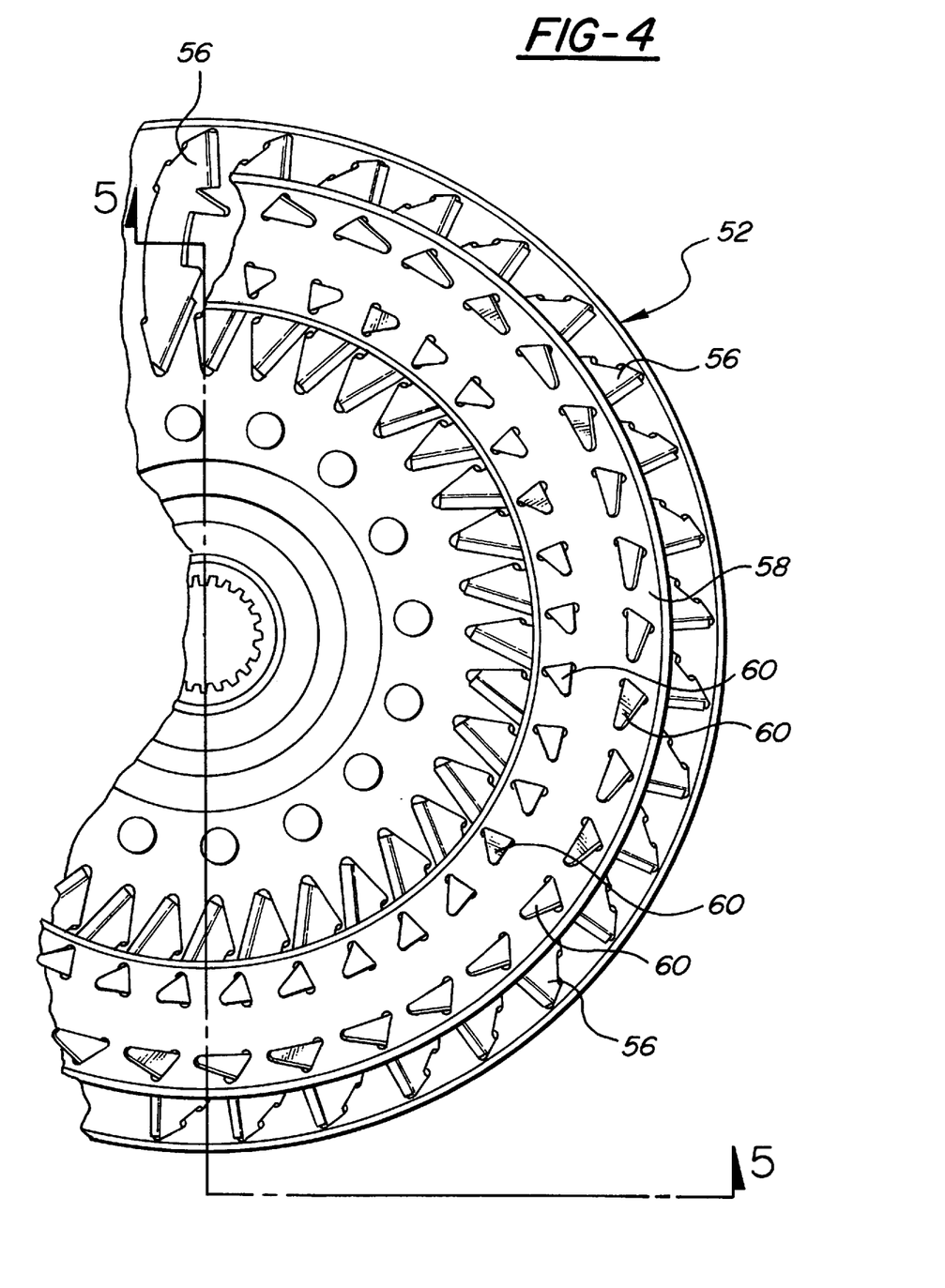
FIG. 4 is a partial plan view of the turbine assembly of the present invention.

The turbine assembly 14 is fluidly connected in driven relationship with the impeller assembly 12. The turbine assembly 14 includes an annular turbine hub 48 which is operatively connected to the input of the transmission and rotatable about an axis 50. A turbine shell 52 is mounted to the turbine hub 48 via rivets 54 or some other suitable fastener. A plurality of turbine blades 56 are carried by the turbine shell 52 as will be described in greater detail below. As best shown in FIGS. 2 and 4, the turbine blades 58 include arcuate inner portions which are fixed to the turbine core 58 through the interaction of wings 60 received in corresponding slots in the turbine core 58.

The torque converter 10 defines a torodial flow path for the fluid contained therein. The turbine shell 52 forms a part of this toroid and is thus semi-torodial in shape. The turbine shell 52 includes rows of radially spaced slots 62 wherein the slots 62 in each of the rows are spaced relative to one another. Likewise, the turbine blades 56 include a series of annularly spaced tabs 64 which correspond to the rows of radially spaced slots 62 in the turbine shell 52. The tabs 64 extend through the slots 62 and are bent at an angle relative to the turbine blades 56 to fix the blades 56 relative to the turbine shell 52, as best shown in FIG. 5.

Figures 3, 5:
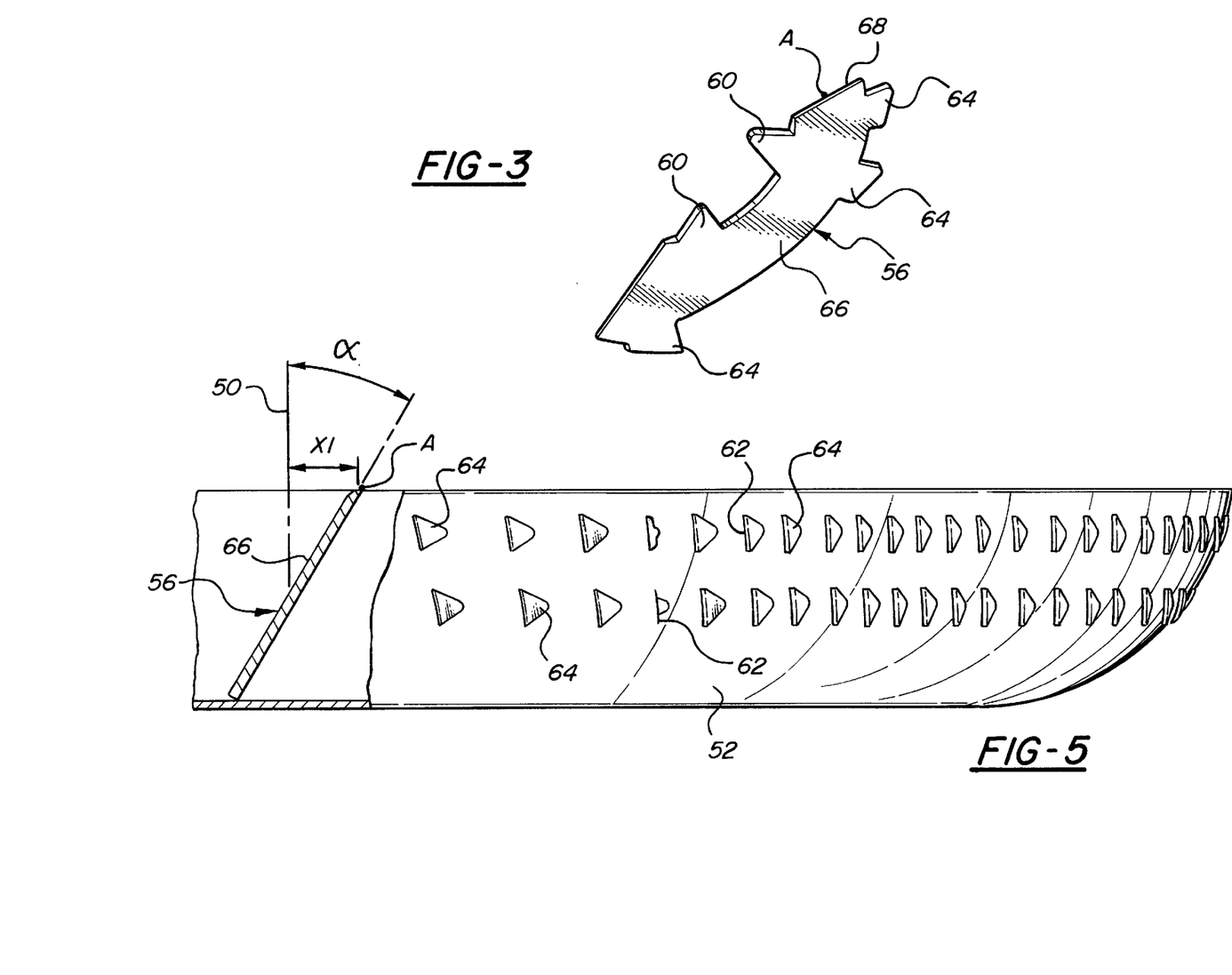
FIG. 3 is a perspective view of the flat turbine blade of the present invention.
FIG. 5 is a partial sectional view of the turbine assembly of the present invention taken substantially along lines 5—5 of FIG. 4.

Referring now to FIG. 3, each of the turbine blades 56 of the present invention include a flat working surface 66 such that each turbine blade 56 is contained in a single plane. Thus, form dies which impart contoured "ruled surfaces" are not required during the manufacture of the turbine blades 56 of the present invention. Furthermore, because the turbine blades 56 of the present invention are planar and without surface curvature or contour, they may be manufactured from a low carbon steel such as SAE 1010 without the concerns of "spring back" which is typically encountered during the manufacture of contoured blades.

Each of the turbine blades 56 has a leading edge 68 which includes a point A. When viewed as illustrated in FIG. 5, the point A on each of the turbine blades 56 is disposed a distance X1 from a plane containing the axis of rotation 50 of the turbine assembly 10. This distance, X1, may be between −30 mm and 30 mm. Further and as viewed in FIG. 2, the point A on the turbine blades 56 will be located on the mean line of the torus of the torque converter.

The lock-up clutch assembly 18 is supported for rotation with the turbine assembly 14 and interposed between the turbine assembly 14 and the torque input member or front cover 20. The lock-up clutch assembly 18 includes an annular piston 70. An annular, disk shaped frictional element 72 is carried proximate to the outer peripheral flange 74 of the piston 70. The piston 70 is rotatably supported for axial movement on the turbine hub 48 into and out of engagement with the inner surface of the front cover 20 to provide direct torque transfer between the front cover 20 and the turbine assembly 14 as will be discussed in greater detail below.

The hydrodynamic torque converter 10 further includes a torsional damper, generally indicated at 76, which operatively interconnects the turbine assembly 14 and the lock-up clutch assembly 18. The torsional damper acts to dampen torsional vibrations due to impact loads and torsional pulsations generated by the internal combustion engine.

OPERATION OF THE TORQUE CONVERTER

Rotation of the crank shaft of the engine causes the front cover 20 to rotate with it through the actuation of the plate member (not shown). The front cover 20 is welded at 24 to the impeller shell 28. Therefore, the impeller assembly 12 rotates with the crankshaft. The fluid within the impeller assembly 12 is set into motion by the rotation of the impeller assembly 12 which is kept filled by the fluid pressure from a host transmission hydraulic pump (not shown). The impeller blades 26 transfers mechanical energy into hydrokinetic energy. As the fluid is put into motion by the impeller blades 26, it is thrown outward by centrifugal forces and deflected into the turbine assembly 14 at an angle. The fluid strikes the flat turbine blades 56 of the turbine assembly 14, thus imparting torque or turning effort to the turbine assembly 14 and causing the turbine shell 52 to rotate about its axis 50. The turbine shell 52 is connected by rivets 54 to the turbine hub 48. The turbine hub 48 is, in turn, operatively connected to the input of the transmission.

During normal operation of the hydrodynamic torque converter 10 at low speed ratios, piston 70 of the lock-up clutch assembly 18 is not applied. Thus, torque is imparted to the input of the transmission via the turbine assembly 14. However, during normal transmission control fluid operation of the hydrodynamic torque converter 10 of the present invention at higher speed ratios, the piston 70 is applied. Fluid pushes the piston 70 against the front cover 20 with the friction disk 72 sandwiched between the two elements. The flow of power or engine torque is then transmitted through the front cover 20 and the lock-up piston 70 directly to the turbine hub 52 and the input to the transmission. Therefore, the front cover 20, lock-up clutch assembly 18, turbine assembly 14 and the input to the transmission rotate together.

Figure 6:
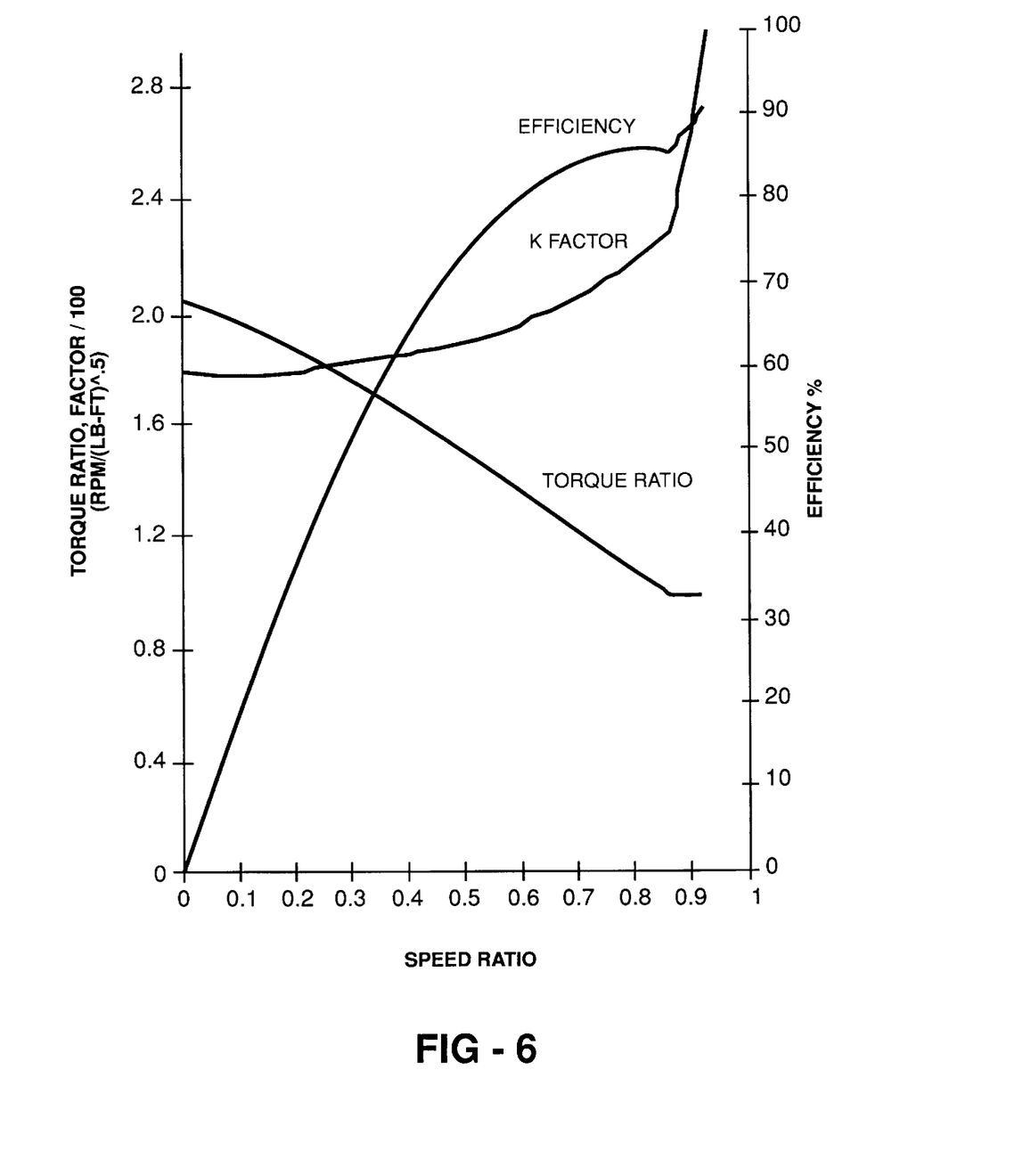
FIG. 6 is a graph of conventional torque converter performance characteristics including efficiency, torque ratio and K-factor.
Figure 7:
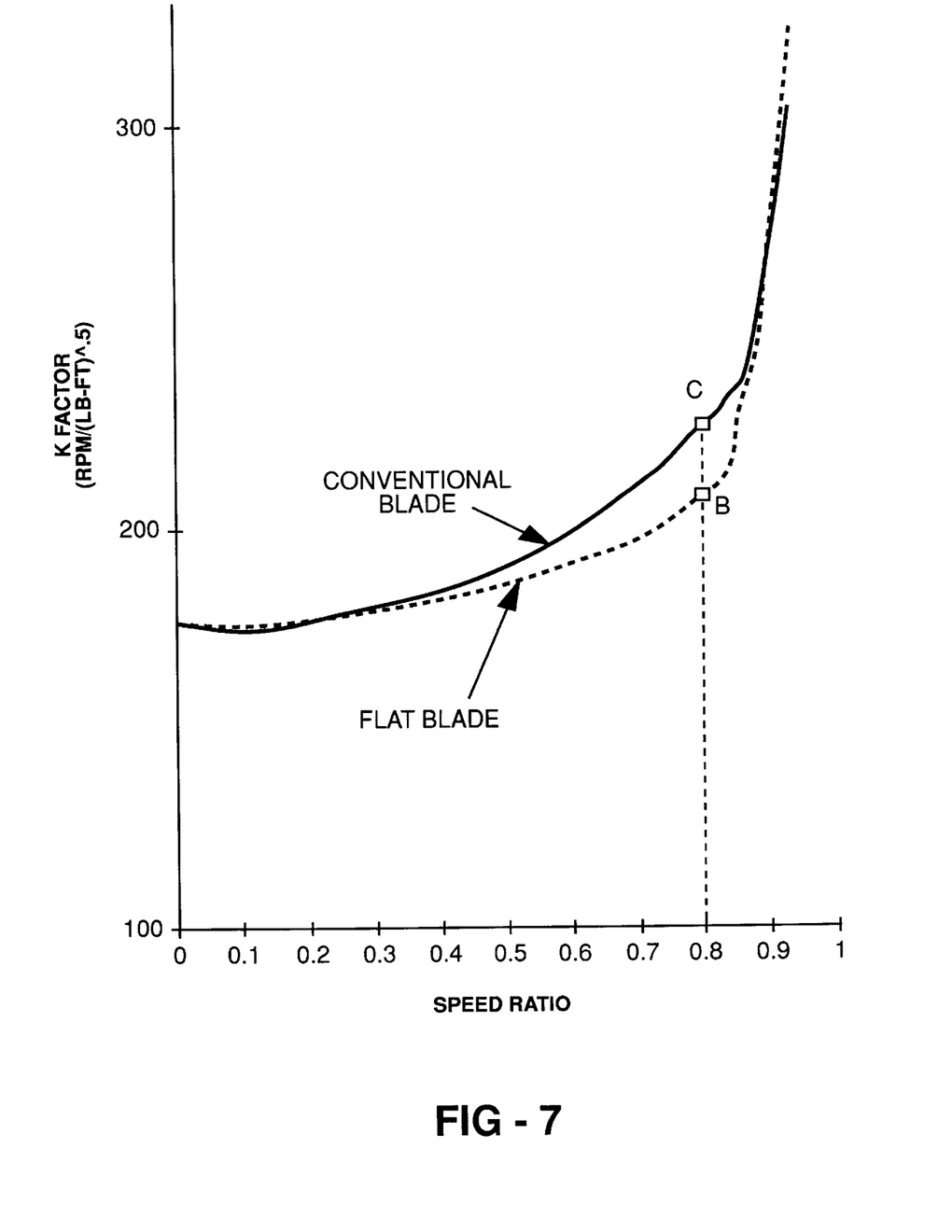
FIG. 7 is a graph of torque converter K-factor versus speed ratio generated using the flat turbine blade of the present invention versus conventional turbine blade.
Figure 8:
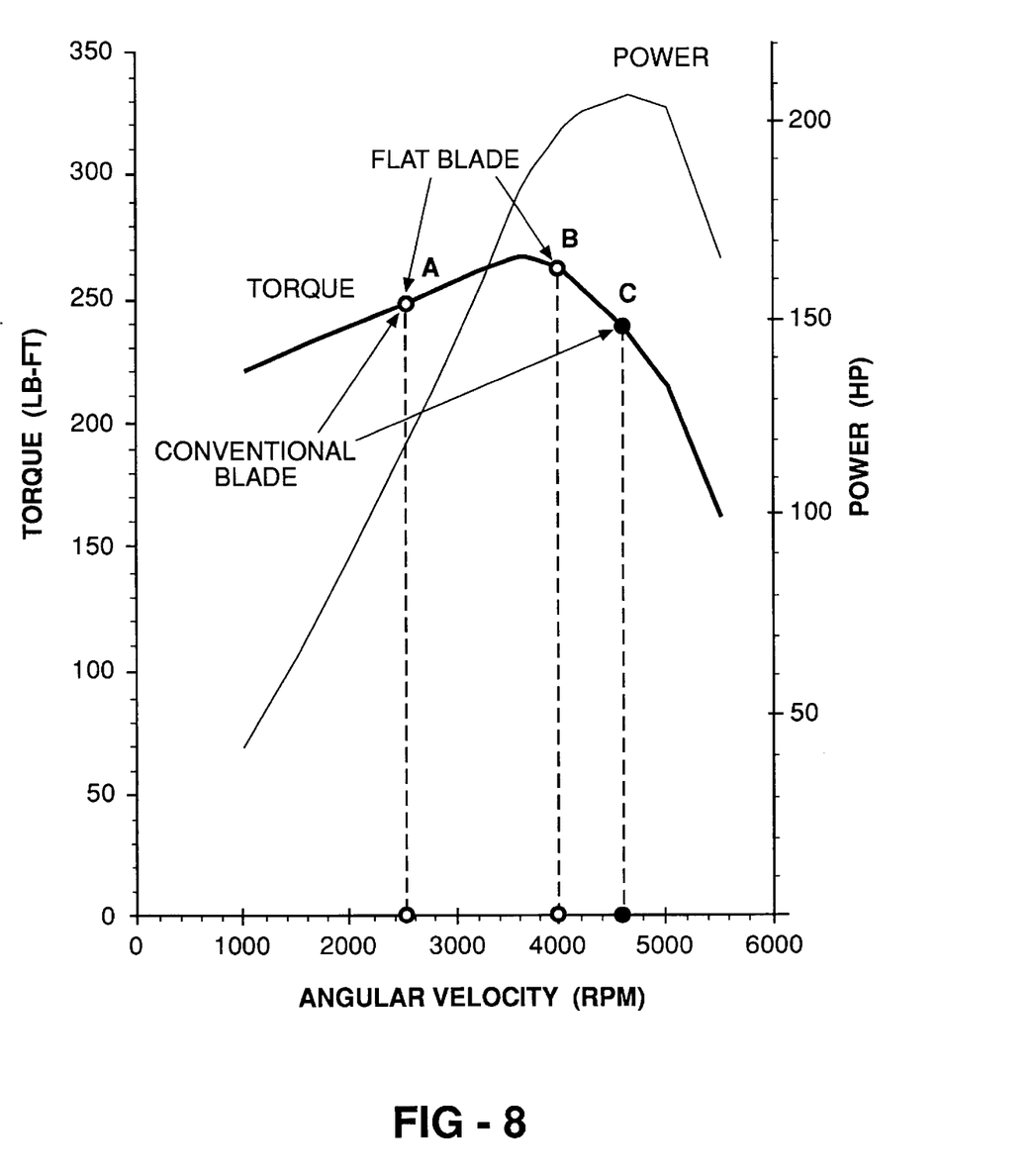
FIG. 8 is a graph comparing typical engine characteristics between a torque converter employing a conventional blade and a torque converter employing a turbine blade of the present invention.

FIG. 6 illustrates a conventional torque converter performance characteristics including efficiency, torque ratio and K-factor. The torque converter 10 of the present invention is used primarily as a launch device, as for example with an electrically controlled converter clutch. Therefore, beyond approximately a 0.7 speed ratio, the efficiency of the torque converter 10 becomes less important. Thus, from a design standpoint, it is important to flatten the K-factor curve at speed ratios below approximately 0.85. As noted earlier, minimizing the torodial axial length versus toroidal radial dimension (L/R1–R2), i.e., increasing the squash of the torque converter, has a negative effect on the K-factor curve. This reduces the efficiency of the conventional torque converters and the fuel economy of the engine. However, using the flat turbine blade 56 of the present invention spatially positioned relative to the axis of rotation 50, the K-factor curve is not negatively effected, even where the ratio of axial length L to radial dimension ($R_1$–$R_2$) is less than 1.0. This is also true for extreme torodial axial squash of between 0.5 and 0.95. This fact is demonstrated graphically in FIG. 7 where the K-factor curve of a convention blade is compared with that of the turbine blade 56 of the present invention at squash ratios of less than 1.0. The K-factor curve of the torque converter 10 employing the spatially positioned flat turbine blade 56 of the present invention is flatter than that of the conventional blade, even at high speed ratios. Further, and by plotting points B and C from FIG. 7 onto the torque curve of FIG. 8, it is shown that, at 0.8 speed ratio, engine torque is optimized at lower engine speed as indicated at point B for the flat blade 56 as opposed to point C for the conventional, contoured blade. Thus, vehicle acceleration and fuel economy can be improved when the torque converter of the present invention is properly matched with a given engine.

The benefits derived by the present invention are not limited to torque converters having extreme torodial axial squash. The spatially positioned flat turbine blade 56 may also be employed in torque converters where the squash ratio is 0.95 to 1.3 or more to help reduce vehicle emissions and improve fuel economy. This is true because even where torodial axial squash is not extreme, the spatially oriented flat turbine blade 56 of the present invention results in flatter K-factor curves through a wide range of speed ratios and maximizes engine torque at lower engine speeds. Furthermore, vehicle acceleration and fuel economy can be improved together with drawbar pull and tractive effort (for industrial applications) where the torque converter of the present invention is properly matched with a given engine.

Accordingly, the flat, spatially positioned turbine blade 56 of the present invention is much less expensive to manufacture than conventional blades and has less performance sensitivity and better performance stability than conventional turbine blades employed in torque converters of the related art. Furthermore, torque converters employing turbine blades of the present invention exhibit flatter K-factor curves at high speed ratios even at extreme torodial axial squash. Thus, the packaging characteristics for torque converters 10 of the present invention may be improved without a reduction in fuel economy and vehicle acceleration.

The present invention has been described in an illustrative manner. It is to be understood that the terminology which has been used is intended to be in the nature of words of description rather than of limitation.

Many modifications and variations of the present invention are possible in light of the above teachings. Therefore, within the scope of the appended claims, the present invention may be practiced other than as specifically described.

What we claim is:

1. A torque converter for translating kinetic energy between a prime mover and a transmission, said torque converter comprising:

a turbine assembly rotatable about an axis and including a shell, a core and a plurality of turbine blades mounted therebetween;

each of said plurality of turbine blades having flat working surfaces such that each of said turbine blades defines a single plane and such that each of said turbine blades is positioned spatially so as to define an angle Alpha of between −5° and 65° relative to the axis of rotation of said turbine assembly and wherein each of said turbine blades has a leading edge including a point A which is disposed a predetermined distance X1 from a plane containing said axis of rotation of said turbine assembly between −30 mm and 30 mm.

2. A torque converter as set forth in claim 1 wherein said torque converter defines a torus, said point A on each of said turbine blades is located on the mean line of the torus of said torque converter.

3. A torque converter as set forth in claim 1 wherein said torque converter defines a torus having an axial length and a radial dimension such that the ratio of the axial length to the radial dimension is less than 1.0.

4. A torque converter as set forth in claim 3 wherein said ratio of the axial length to the radial dimension is between 0.5 and 0.95.

5. A torque converter as set forth in claim 1 wherein the torque converter defines a torus having an axial length and a radial dimension such that the ratio of the axial length to the radial dimension is greater than 1.

6. A torque converter as set forth in claim 5 wherein the ratio of the axial length to the radial dimension is between 0.95 and 1.3.

7. A torque converter as set forth in claim 1 wherein said turbine shell is semi-toroidal in shape and includes a series of radially spaced slots, said plurality of turbine blades including a series of radially spaced tabs corresponding to said series of radially spaced slots and extending therethrough and bent at an angle relative to the turbine blades to fix said turbine blades relative to said turbine shell.

8. An automotive transmission comprising:

an input shaft, a torque converter for translating torque from a prime mover to said input shaft of said transmission, said torque converter including an impeller assembly operatively coupled for rotation with said input shaft and a turbine assembly fluidly connected in driven relationship with said impeller assembly;

said turbine assembly rotatable about an axis and including a turbine hub, a turbine shell mounted to said turbine hub, a core and a plurality of turbine blades mounted between said hub and said core;

each of said plurality of turbine blades having flat working surfaces such that each of said turbine blades defines a single plane and such that each of said turbine blades is positioned spatially so as to define an angle Alpha of between −5° and 65° relative to the axis of rotation of said turbine assembly and wherein each of said turbine blades has a leading edge including a point A which is disposed a predetermined distance X1 from a plane containing said axis of rotation of said turbine assembly between −30 mm and 30 mm.

9. A torque converter as set forth in claim 8 wherein said torque converter defines a torus, said point A on each of said turbine blades is located on the mean line of the torus of said torque converter.

10. A torque converter as set forth in claim 8 wherein said torque converter defines a torus having an axial length and a radial dimension such that the ratio of the axial length to the radial dimension is less than 1.0.

11. A torque converter as set forth in claim 10 wherein said ratio of the axial length to the radial dimension is between 0.5 and 0.95.

12. A torque converter as set forth in claim 8 wherein the torque converter defines a torus having an axial length and a radial dimension such that the ratio of the axial length to the radial dimension is greater than 1.0.

13. A torque converter as set forth in claim 12 wherein the ratio of the axial length to the radial dimension is between 0.95 and 1.3.

14. A torque converter as set forth in claim 8 wherein said turbine shell is semi-toroidal in shape and includes a series of radially spaced slots, each of said plurality of turbine blades including a series of radially spaced tabs corresponding to the series of radially spaced slots and extending therethrough and bent at an angle relative to the turbine blades to fix said turbine blades relative to said turbine shell.

15. A torque converter for translating kinetic energy between a prime mover and a transmission, said torque converter comprising:

a front cover, an impeller assembly operatively coupled for rotation with said front cover, a turbine assembly fluidly connected in driven relationship with said impeller assembly, said turbine assembly rotatable about an axis and including a shell, a core, and a plurality of turbine blades mounted therebetween, each of said turbine blades having flat working surfaces such that each of said turbine blades defines a single plane, and a clutch assembly supported for rotation with said turbine assembly and interposed between said turbine assembly and said front cover, said clutch assembly movable into engagement with said front cover to provide torque translation between said front cover and said turbine assembly at speed ratios below 0.8 such that the torque converter is used primarily as a launch device.

16. A torque converter as set forth in claim 15 wherein said clutch assembly includes an electrically controlled converter clutch which is movable into engagement with said front cover to provide torque translation between said front cover and said turbine assembly at lower speed ratios such that the torque converter is used primarily as a launch device.

17. A torque converter as set forth in claim 16 wherein said clutch assembly is moveable into engagement with said front cover substantially at the coupling point.

\* \* \* \* \*